(12) United States Patent
Carvalhar Marins et al.

(10) Patent No.: US 10,590,743 B2
(45) Date of Patent: Mar. 17, 2020

(54) SUBMARINE ELECTRICAL HEATING SYSTEM, METHOD TO REMEDY AND TREAT HYDRATES AND USE OF THE SAID SYSTEM

(71) Applicant: FMC TECHNOLOGIES DO BRASIL LTDA, Rio de Janeiro (BR)

(72) Inventors: Alexandre Carvalhar Marins, Niterói (BR); Arthur Eugênio De Almeida Filho, Rio de Janeiro (BR); Calvino Do Rosário Cordeiro Junior, Rio de Janeiro (BR); Jose Felipe Freire Machado, Rio de Janeiro (BR); Fernando Miranda Corrêa De Guamá, Rio de Janeiro (BR)

(*) Notice: Subject to any disclaimer, the term of this patent is extended or adjusted under 35 U.S.C. 154(b) by 0 days.

(21) Appl. No.: 15/754,178

(22) PCT Filed: Aug. 17, 2016

(86) PCT No.: PCT/BR2016/050204
§ 371 (c)(1),
(2) Date: Feb. 21, 2018

(87) PCT Pub. No.: WO2017/031563
PCT Pub. Date: Mar. 2, 2017

(65) Prior Publication Data
US 2018/0245431 A1   Aug. 30, 2018

(30) Foreign Application Priority Data
Aug. 21, 2015  (BR) .......................... 1020150202458

(51) Int. Cl.
*E21B 36/04*   (2006.01)
*H05B 3/04*    (2006.01)
(Continued)

(52) U.S. Cl.
CPC .............. *E21B 36/04* (2013.01); *F16L 53/32* (2018.01); *F16L 53/38* (2018.01); *H05B 3/04* (2013.01);
(Continued)

(58) Field of Classification Search
CPC ........... E21B 36/04; F16L 53/32; F16L 53/38; H05B 3/04; H05B 3/78; H05B 2203/021; H05B 2214/03
(Continued)

(56) References Cited

U.S. PATENT DOCUMENTS 5,424,608 A    6/1995  Juengst et al.
5,978,550 A   11/1999  Rochelle
(Continued)

FOREIGN PATENT DOCUMENTS

GB        2 485 647 A       5/2012

OTHER PUBLICATIONS

International Search Report issued in PCT/BR2016/050204 dated Dec. 16, 2016 (4 page).
(Continued)

*Primary Examiner* — Anna M Momper
*Assistant Examiner* — Patrick F Lambe
(74) *Attorney, Agent, or Firm* — Osha Liang LLP

(57) ABSTRACT

A system and method are able to generate and dissipate heat internally to a certain submarine equipment by applying electric power, aiming to aid in the remediation and treatment of hydrate, which was formed in its inside, aiming its effective spreading. The said system is specially suitable to be used in submarine equipments involved in the fluids flowing linked to Oil and Gas Industry, and includes a cavity filled with a fluid suitable for heat transfer, in which a penetrator is installed thereon interlinking an encapsulated resistance to a compensated hose filled with dielectric oil (Continued)

housing inner electrical wires. The said hose has an electrical connector suitable for operating with ROV in its end.

7 Claims, 1 Drawing Sheet

(51) Int. Cl.
  *H05B 3/78* (2006.01)
  *F16L 53/32* (2018.01)
  *F16L 53/38* (2018.01)
(52) U.S. Cl.
  CPC ......... *H05B 3/78* (2013.01); *H05B 2203/021* (2013.01); *H05B 2214/03* (2013.01)
(58) Field of Classification Search
  USPC .......................................................... 166/335
  See application file for complete search history.

(56) References Cited

U.S. PATENT DOCUMENTS

| | | | |
|---|---|---|---|
| 6,315,497 B1 | 11/2001 | Wittman et al. | |
| 6,564,011 B1 | 5/2003 | Janoff et al. | |
| 2013/0199615 A1* | 8/2013 | McHugh | ............... F16K 49/005 |
| | | | 137/1 |
| 2013/0312996 A1* | 11/2013 | Nicholson | .............. H02G 9/065 |
| | | | 174/50.52 |

OTHER PUBLICATIONS

Written Opinion of the International Searching Authority issued in PCT/BR2016/050204 dated Dec. 16, 2016 (5 pages).
International Preliminary Report on Patentability from PCT/BR2016/050204 dated Oct. 2, 2017 (9 pages).

* cited by examiner

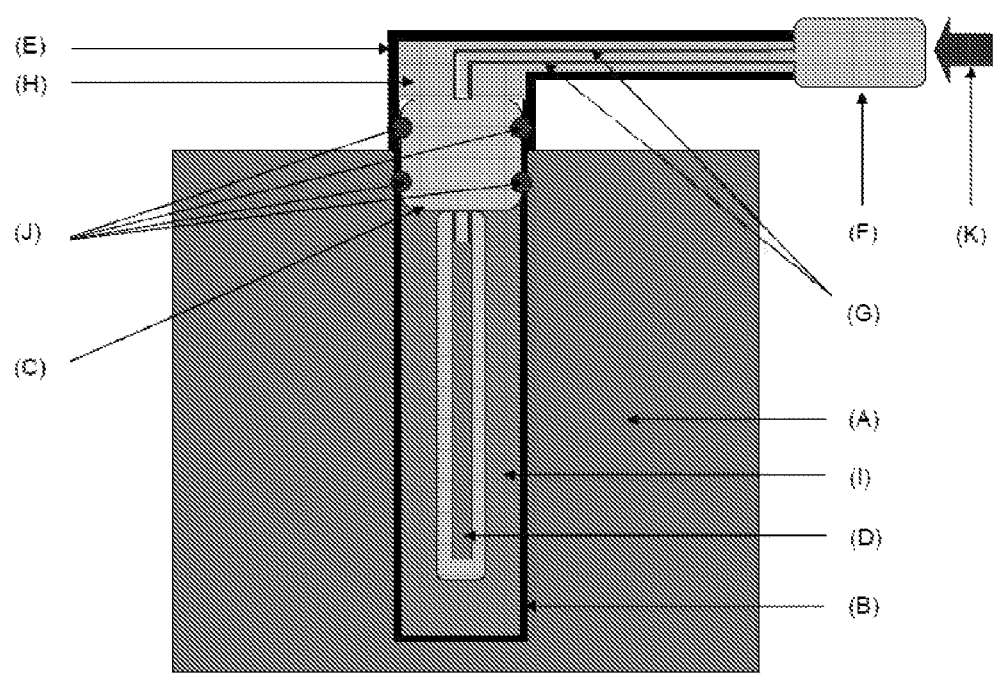

SUBMARINE ELECTRICAL HEATING SYSTEM, METHOD TO REMEDY AND TREAT HYDRATES AND USE OF THE SAID SYSTEM

FIELD OF THE INVENTION

The present invention refers to a system and method of heating for production submarine equipments involved in the fluids flowing and applied in the Oil and Gas Industry, as for example, valves and flow rate gauges, between others. The present invention is intended to aid in the remediation and treatment hydrate, which was formed and deposited inside the tubing and equipments, by applying electric power to a resistance, generating and dissipating heat. This resistance is internally installed to the equipment and receives energy from electrical supply of a ROV (Remote Operated Vehicle).

BACKGROUND OF THE INVENTION

One of the greatest challenges found in the Oil and Gas Industry, is related to mitigation, treatment and remediation of hydrates.

Gas hydrates are crystalline solids based on water physically similar to ice, wherein small non-polarized molecules are captured inside "cages" of water molecules joined by hydrogen bonding. In other words, water acts as a host molecule and the host molecule is typically a gas.

Most part of gases with low molecular weight, as for example, $O_2$, $H_2$, $N_2$, $CO_2$, $CH_4$, $H_2S$, Ar, Kr, and Xe, as well as some upper hydrocarbons and freons may form hydrates under suitable conditions of temperature and pressure.

Formation and dissociation of hydrates occur through transitions of first order phase, and non-chemical reactions. However, once there is no binding between water molecules and gas at issue, hydrates may not be considered chemical compounds.

When hydrates' formation occurs in a flowing system, a blocking "plug" is formed avoiding the production flow. Such blocking is extremely difficult to be reverted and mechanisms normally employed for treating and dissociating hydrates and, consequently, the system unblocking, require several equipments and may take, eventually weeks, generating huge losses and increasing the risks involved in the process, besides the time wherein the production is stopped.

In this way, systems are operated with preventive measures in a way to avoid creating conditions favorable to hydrates formation. An example widely used in the systems is the injection of an alcohol, as for example, the monoethylene glycol (MEG), enabling the temperature of hydrate formation is displaced to a much lower temperature, even when pressure and temperature conditions are kept, eventually, enabling the production continuity.

Once formed, so that hydrates are dissociated it is necessary to make its phase change, modifying pressure or temperature variables, or even both. However, these modifications are only possible using the equipments specific for pressure relief, and may require the use of support vessels, fluids circulation, among others, impacting in the production and in the process cost.

Techniques used for heating submarine equipments externally through hot water circulation or even circulation of electrical current for remediation and treatment hydrate aiming its effective spreading, are known. However, it is not described any method or system involving the heat application internally to submarine equipment.

The U.S. Pat. No. 6,564,011 discloses a heating system, for remedying hydrate, applicable to submarine equipments for producing oil and gas, which is constituted of an electrical cable positioned in the external wall of the equipment, protected by a thermal isolating layer, and that generates heat by circulating electrical current.

The U.S. Pat. No. 5,424,608 discloses a heating system, for remedying hydrate, applicable to submarine equipments for producing oil and gas, which is constituted of a tubing positioned in the equipment external wall, protected by a thermal isolating layer, and that generates heat by circulating hot water.

In both documents systems applicable to submarine equipments are described. But, both use heat sources positioned in the external walls of these equipments.

Further, the use of heat sources outside the equipment, either in the case of electrical current circulation as in hot water circulation, it is not a much efficient feature. The heat transmission of the external part to the internal part may not occur in the most suitable manner, as well as the thermal coupling of the external wall of the equipment to its inside may not be good. In addition, the system assemble allows a lot of heat exchange with the external mean even in the presence of thermal insulation.

Due to lack of efficiency of the systems now existent, the amount of energy required for heating is too increased. Normally, for these cases the only source able to provide energy necessary for the system is found in the surface, once, difficultly a ROV have this energy amount available, which increase the cost and operationally makes it much harder for the systems using these solutions.

In this way, it is necessary to develop new alternative methods and systems most viable and efficient in the remediation and treatment of hydrate aiming its effective spreading, applicable to submarine equipments, promoting its unblocking, allowing its correct operation and enabling the production flow warranty.

Aiming to solve the state of art problems, mentioned above, it was developed a system able to generate and dissipate heat in the internal area of the equipment, using the electrical supply energy of a ROV.

BRIEF DESCRIPTION OF THE FIGURE

The present invention will be described in the following regarding the attached FIGURE, which represents a schematic form and not limitative to its scope.

FIG. 1 represents a partial schematic form of the cross section of a submarine equipment according to the present invention illustrating its main components.

DETAILED DESCRIPTION OF THE INVENTION

In a first aspect, the present invention provides an internal heating system for submarine equipments, by applying electric power. According to the present invention it becomes possible to promote the remediation of hydrates formed inside the equipment by supplying heating.

The said system is formed by a cavity (B) arranged in the body of a submarine equipment (A), filled with a fluid suitable for heat transfer (thermal fluid) (I) and in which a penetrator (C) is installed coupled to an encapsulated resistance (D). The said penetrator (C) acts as a barrier for external environment and ensures the cavity (B) is with the atmospheric pressure due to an O-ring type sealing barrier (J).

The other side of the penetrator (C) is interlinked to a compensated hose (E) to support the sea bottom pressure, provided with inner electrical wires (G) and being filled with dielectric oil (H).

The opposed side of the hose is ended in an electrical connector "subseawet mate connector" suitable to operate with a ROV (F), working as point of contact with the energy source (K) received from the said ROV.

The energy received is then changed into heat through Joule effect, in a way the resistance exposure to electrical energy for a determined period of time will result in the production of thermal energy, according to equations below:

$$P \text{ (watts)} = E \times I = E^*2/R \qquad (i)$$

$$R = E^*2/P \qquad (ii)$$

where P=watts; E=volts; I=amperes; and R=Ω (ohms).

As can be appreciated by those skilled in the art, the documents of the state of the art mentioned above disclose methods wherein the heat is generated in a place outside that on where it must act to, then, be directed to the place where hydrates to be dissociated are met, occurring by conduction. In the present invention the system acts in a more located form, which is able to generate heat internally to the equipment and dissipate it by its surrounding reaching efficiently the hydrates agglomerate. In this way, the present invention avoids the problems presented by the methods of the state of the art, as for example, heat loss, high energetic demand, low efficiency, among other drawbacks.

In a second aspect, the present invention provides a method for remedying and treating hydrates aiming its effective spreading, applicable to a submarine equipment and comprising the steps of:
  i) provide the coupling of an energy source to an electrical connector of the submarine electrical heating system;
  ii) provide the electric power supply to an encapsulated internal electrical resistance;
  iii) change the said electrical energy into thermal energy through the said electrical resistance;
  iv) provide the thermal energy spreading throughout the environment inside the equipment and its surrounding.

In a third aspect, the present invention refers the use of the submarine electrical heating system according to the present invention for remedying and treating hydrates aiming its effective spreading, in fluids flowing systems in the Oil and Gas Industry.

The invention claimed is:

1. A submarine electrical heating system, comprising:
  a body of a submarine equipment;
  a cavity formed in the body and filled with a fluid suitable for heat transfer;
  a penetrator installed in the cavity having an O-ring type sealing barrier, thereby sealing the fluid suitable for heat transfer within the cavity;
  an encapsulated resistance disposed in the cavity and coupled to the penetrator, the encapsulated resistance positioned to generate heat within the cavity;
  a compensated hose filled with dielectric oil, the penetrator interlinking the encapsulated resistance to the compensated hose, the compensated hose housing inner electrical wires; and
  an electrical connector in an end of the compensated hose, the electrical connector being a point of contact with an energy source.

2. The system, according to claim 1, wherein the submarine equipment is any submarine equipment involved in fluids flowing systems employed in the Oil and Gas Industry.

3. The system, according to claim 2, wherein the submarine equipment is selected between slide type valves, ball type valves, monophasic flow gauges or multiphasic flow gauges.

4. The system, according to claim 1, wherein the energy source is a ROV.

5. The system, according to claim 1, wherein the electrical connector is subsea wet-mate connector type.

6. A method to remedy and treat hydrates, comprising:
  i) providing the coupling of an energy source to the electrical connector of the submarine electrical heating system according to claim 1;
  ii) providing the supply of electric power to the encapsulated resistance;
  iii) changing the said electrical energy into thermal energy through the encapsulated resistance within the cavity; and
  iv) providing the thermal energy spreading throughout the environment of the equipment and surroundings of the said equipment.

7. A method to remedy and treat hydrates, comprising:
  1) providing the submarine electrical heating system according to claim 1;
  2) applying the system for remedying and treating hydrates aiming an effective dissociation of said hydrates in fluids flowing systems in the Oil and Gas Industry.

* * * * *